United States Patent
Settles et al.

(10) Patent No.: US 8,522,471 B2
(45) Date of Patent: Sep. 3, 2013

(54) FIREARMS AND FIREARM COMPONENTS COMPRISING BONDED MULTI-METALLIC MATERIALS; METHODS OF MANUFACTURE

(75) Inventors: Nelson Clare Settles, East Wenatchee, WA (US); Shaun Michael McGuire, East Wenatchee, WA (US)

(73) Assignee: Pacific Aerospace & Electronics, Inc., Wenatachee, WA (US)

( * ) Notice: Subject to any disclaimer, the term of this patent is extended or adjusted under 35 U.S.C. 154(b) by 150 days.

(21) Appl. No.: 13/178,423

(22) Filed: Jul. 7, 2011

(65) Prior Publication Data

US 2012/0017481 A1    Jan. 26, 2012

Related U.S. Application Data (63) Continuation-in-part of application No. 12/823,383, filed on Jun. 25, 2010, now Pat. No. 8,136,286.

(60) Provisional application No. 61/473,573, filed on Apr. 8, 2011.

(51) Int. Cl.
*F41C 27/00* (2006.01)

(52) U.S. Cl.
USPC ............... 42/106; 42/75.1; 42/76.02; 42/76.1

(58) Field of Classification Search
None
See application file for complete search history.

(56) References Cited

U.S. PATENT DOCUMENTS

| | | | |
|---|---|---|---|
| 3,140,539 A | 7/1964 | Holtzman | |
| 4,580,484 A | 4/1986 | Moore | |
| 5,669,169 A * | 9/1997 | Schmitter et al. | ............ 42/75.01 |
| 5,915,937 A | 6/1999 | Christensen | |
| 6,189,431 B1 | 2/2001 | Danner et al. | |
| 6,557,289 B2 | 5/2003 | Stall et al. | |
| 6,711,819 B2 | 3/2004 | Stall et al. | |
| 7,530,485 B1 | 5/2009 | Brasher et al. | |
| 7,802,392 B2 | 9/2010 | Peterson et al. | |
| 7,934,332 B2 | 5/2011 | Briggs | |

(Continued)

OTHER PUBLICATIONS

Cutter, David, "What You Can Do with Explosion Welding," Welding Journal, Jul. 2006, pp. 38-43.

(Continued)

*Primary Examiner* — Bret Hayes
*Assistant Examiner* — Joshua Freeman
(74) *Attorney, Agent, or Firm* — Ann W. Speckman; Speckman Law Group PLLC

(57) ABSTRACT

Firearms and firearm components are constructed from bonded multi-metallic base materials comprising at least two dissimilar metallic materials having different properties, such as weight, density, wear resistance, durability, hardness, and the like, bonded to one another. The components are fabricated such that the metallic material having higher impact- and wear-resistance is positioned at areas that experience impact, or that include bearing points, wear points, and interfaces with other components, while a lighter weight metallic material is positioned at component locations that don't have rigorous material property requirements. The bonded multi-metallic materials may be explosively bonded multi-metallic materials.

23 Claims, 3 Drawing Sheets

(56) References Cited

U.S. PATENT DOCUMENTS

| | | |
|---|---|---|
| 2002/0187020 A1 | 12/2002 | Julien |
| 2004/0093783 A1 | 5/2004 | O'Dwyer |
| 2004/0149806 A1 | 8/2004 | Hardwick |
| 2004/0170860 A1 | 9/2004 | Hardwick et al. |
| 2005/0188585 A1* | 9/2005 | Vicate .......................... 42/71.01 |
| 2006/0150466 A1 | 7/2006 | Hochstrate et al. |
| 2007/0051439 A1* | 3/2007 | Van Der Winden .......... 148/546 |
| 2007/0163460 A1 | 7/2007 | Dave et al. |
| 2007/0261286 A1 | 11/2007 | Briggs |
| 2008/0052977 A1 | 3/2008 | O'Dwyer et al. |
| 2008/0301994 A1 | 12/2008 | Langevin et al. |
| 2009/0056191 A1 | 3/2009 | Battaglia |
| 2010/0236122 A1 | 9/2010 | Fonte |

OTHER PUBLICATIONS

Souriau PA&E, "Explosive Metal Bonding Capabilities," Product Brochure, http://www.pacaero.com/products/explosive-bonding.htm, (2007) May 7, 2013.

Souriau PA&E, "Explosion Metal Welded Compositions," Product Brochure, Pacific Aerospace & Electronics, Wenatchee, WA, http://www.pacaero.com (2007).

Souriau PA&E, "Data Sheet: Bonded Materials," Product Brochure, Pacific Aerospace & Electronics, Wenatchee, WA, http://www.pacaero.com (2007).

Souriau PA&E, "Bonded Explosive Welding," Product Brochure, Pacific Aerospace & Electronics, Wenatchee, WA, http://www.pacaero.com (2007).

* cited by examiner

FIREARMS AND FIREARM COMPONENTS COMPRISING BONDED MULTI-METALLIC MATERIALS; METHODS OF MANUFACTURE

REFERENCE TO PRIORITY APPLICATIONS

This application is a continuation-in-part of U.S. patent application Ser. No. 12/823,383, filed Jun. 25, 2010 and this application claims priority under 35 U.S.C. §119(e) to U.S. Provisional Patent Application No. 61/473,573, filed Apr. 8, 2011. These patent applications are incorporated herein by reference in their entireties.

TECHNICAL FIELD OF THE INVENTION

The present invention relates to firearms comprising components fabricated from dissimilar metallic materials and, more specifically, to firearms comprising components fabricated from metallurgically bonded multi-metallic materials and to firearms components comprising metallurgically bonded multi-metallic materials. Methods for manufacturing such components and firearms are also disclosed.

BACKGROUND OF THE INVENTION

Firearms such as handguns (e.g., pistols), including semi-automatic handguns, have been in use for centuries. The M1911 pistol, for example, originated in the late 1890s and it, in addition to several other handguns, were adopted for military service in the early 1900s. Various types of handguns, including single and double action semi-automatic pistols are used by military and law enforcement personnel, as well as by individuals, throughout the world.

Many of the components of firearms experience high impact during firing and must be constructed from materials that have high strength and corrosion-, impact- and wear-resistant properties. These components are largely constructed from metallic materials having high strength, as well as corrosion-, wear- and impact-resistance properties, such as various iron-containing metallic materials, including stainless steel materials. Other components that do not experience high impact or wear, or do not require high strength, are sometimes constructed from aluminum or polymeric materials. Some firearms have been fabricated using all stainless steel components, while others are constructed from a combination of iron-containing materials, non-iron containing materials, and polymeric materials. Firearm components are generally fabricated using various metal stamping, machining, milling, metal forming, casting, forging, and other techniques. Individual components may be welded to one another to form assemblies.

Because many firearm components are generally constructed, entirely or nearly entirely, of heavy, rigid, durable materials such as various types of stainless steel and other iron-containing materials, the overall weight of firearms is generally substantial. It is desirable, for many applications, to reduce the overall weight of firearms without reducing the strength, or the corrosion-, impact- and wear-resistance and reliability of the firearms and their components. U.S. Pat. No. 6,711,819, for example, relates to firearms having lightweight but strong components made of scandium containing aluminum alloys, which are composed of an aluminum alloy containing alloying elements including, in addition to aluminum, from about 0.05% to about 00.30% scandium with other elements such as magnesium, chromium, copper and zinc.

In other attempts to reduce weight, yet maintain the other desirable properties, firearms have been constructed using components having different metallic compositions, such as using a stainless steel slide component and an aluminum body. Other attempts to reduce the weight of firearms have involved the use of wear-resistant polymeric materials on the frame, generally in combination with an iron-containing slide component. Some components, such as triggers, have been fabricated from lighter weight alloy materials such as titanium-containing materials. While most firearm barrels are composed of iron-containing materials, at least one attempt to reduce the weight of a barrel is shown in U.S. Pat. No. 6,189,431, which discloses a lightweight composite gun barrel for a small caliber firearm having a substantially metallic liner and an outer layer comprising fiber reinforced resin.

The explosion bonding phenomenon was observed during World War II when the force of explosions was observed to metallurgically weld bomb fragments to impacted metal objects. DuPont developed a practical explosion bonding process for bonding different metallic materials in the early 1960s, which is described in U.S. Pat. No. 3,140,539.

The art of explosion bonding materials is well known. In general, explosion bonding is a solid-state welding process that uses controlled explosive energy to force two or more metals together at high pressures. The constituent metallic layers of the resultant multi-layer composite system are joined by a high quality metallurgical bond which generally forms an abrupt transition from the one metallic layer to the other dissimilar metallic layer with virtually no degradation of the physical and mechanical properties of the constituent metallic layers. The two most common resultant bulk shapes of explosively bonded materials are rectangular sheet materials having planar bond lines and cylindrical materials having cylindrical bond lines.

A wide range of metals can be explosively bonded to one another and multiple layers of dissimilar metals bonded to one another in sequence to form multi-layer bonded metallic substrates are not uncommon. Bonded bi- or multi-metallic substrates can be machined and incorporated into a variety of products. Applications for such materials include weld transitions between dissimilar metal components, precious metal conservation, galvanic corrosion prevention, corrosion-resistant linings, bearing surfaces, and radiation shielding. These materials are used in industries as diverse as hermetic electronic packaging, marine shipbuilding, chemical processing, golf clubs, sputter targets and cooking griddles.

SUMMARY OF THE INVENTION

In general, lighter weight firearms and firearms components are desirable. Many firearms components have strength, hardness, wear-resistance, impact-resistance and/or durability requirements, however, that lighter weight materials in general don't satisfy. For many firearms components, high wear- and impact-resistance properties are required at certain load or bearing points, or at interfaces with other components, while other component areas have less rigorous material requirements. The applicant proposes using lightweight metallic material(s), such as aluminum or an aluminum-containing material or alloy, that is intimately and reliably bonded to a high strength, high impact- and wear-resistant material, such as an iron-containing or titanium-containing material, to provide a bonded multi-metallic material for use in the construction of firearms and firearms components. The applicant discovered, unexpectedly, that metallurgically bonded multi-metallic materials composed of metals having different properties and comprising, for example, a generally lightweight material, such as aluminum or an aluminum-containing metallic material, metallurgically bonded to a higher strength, more wear- and impact-resistant metallic material, such as an iron- or titanium-containing metallic material, are highly desirable for use in the construction of firearms and firearms components.

The metallurgically bonded multi-metallic materials used for fabricating firearms components of the present invention comprise at least two dissimilar metallic materials and are generally provided as a multi-layered substrate. Metallurgically bonded multi-metallic materials and firearms components of the present invention may comprise at least two dissimilar metallic materials provided as at least two or more distinct metallic layers having at least one metallurgical bond region. In general, the term "metallurgical bond," as it is used in this specification, refers to a bond between two metals whose interface is predominantly free of voids, oxide films and discontinuities. In many cases, a metallurgical bond is characterized by a reaction zone between the two metals that is on the order of several atomic layers on the surface of each metal.

At least two dissimilar metals may be bonded directly to one another, as is known in the art, using a technique such as explosion bonding. Explosively bonded multi-metallic materials are known in the art and are available commercially. Explosively bonded multi-metallic substrates are generally fabricated by stacking dissimilar metallic layers (e.g., having a flat sheet, cylindrical or another tubular form) next to one another and using explosive charges to bond them to one another. The explosions generate significant instantaneous pressures across the interface surfaces of the dissimilar metals to bond them to one another. Alternatively, certain metallurgically bonded multi-metallic materials may be provided using other techniques, such as metal cladding, high pressure and thermal bonding techniques, roll bonding techniques, casting techniques, or the like.

In some embodiments, at least two dissimilar metals may be bonded directly to one another using roll-bonding or similar techniques. Additional dissimilar metal layers, or additional metal layers having compositions similar to or the same as those they bond to, may be provided using roll bonding, explosion bonding, and other metal joining techniques. Some multi-metallic bonded substrates of the present invention may thus contain multiple metal bond regions formed using different bonding techniques. In one embodiment, multi-metallic substrate materials comprise dissimilar metal layers metallurgically bonded to one another along a bond zone formed by roll bonding with at least on additional layer metallurgically bonded to one of the metal layers along a bond zone formed by a technique other than roll bonding, such as an explosive bonding technique. In preferred embodiments, each of the bonding regions is characterized by a reaction zone between adjacent metals (similar or dissimilar) that is on the order of several atomic layers thick.

Bonded multi-metallic substrates used for fabricating firearms and firearms components of the present invention are generally provided as sheet materials, cylindrical shapes or other tubular shapes, from which rough blanks may be machined or otherwise fabricated. Layers of constituent metallic materials may be as thin as about 0.1 cm or less, and up to 10 cm or more thick. Metallurgical bond regions are typically planar when the bonded multi-metallic materials are provided in a sheet or sheet-like form. The constituent layers may have a generally uniform thickness, or they may have a non-uniform thickness. Alternatively, the bond region may be generally tubular or cylindrical in bonded multi-metallic materials having a tubular or cylindrical configuration.

Firearms and firearms components of the present invention are thus constructed from bonded multi-metallic base materials comprising at least two dissimilar metallic materials having different properties, such as weight, density, wear-resistance, impact-resistance, durability, hardness, toughness, metallic luster, color and the like, bonded to one another. The firearms components are generally designed and fabricated from multi-metallic material substrates such that the metallic material having higher strength, toughness, impact- and/or wear-resistance is positioned at load and/or bearing points, wear points, impact points and/or interfaces with other components, while the metallic material having a lower weight and, generally, lower impact- and wear-resistance properties, is positioned at other component locations that have less rigorous material property requirements.

Firearms components of the present invention may be fabricated from metallurgically bonded multi-metallic materials including combinations of various iron-containing metals and alloys such as steels and steel alloys identified by the American Iron and Steel Institute designations ranging from 1000 to 7000 and including specifically and without limitation, steel alloys 4140, 4340 and 8620, as well as stainless steels, e.g. stainless steels identified by the American Iron and Steel Institute designations ranging from 200 to 400 and including specifically and without limitation, stainless steels 301, 302, 303, 303Se, 304, 304L, 309, 316, 316L, 321, 410, 416, 440A, 440B and 440C bonded to non-iron containing metallic materials. Exemplary non-iron containing metallic materials include, without limitation, aluminum and aluminum-containing metals and alloys such as Aluminum Association alloys from the 1000 through 7000 series, inclusive, and including specifically and without limitation, aluminum alloys 2024, 5086, 6061, 6062, 6063, and 7075, as well as aluminum alloys containing scandium and/or other alloying elements, titanium and titanium-containing metals and alloys such as SAE/ASTM Unified Numbering System alloys of the R50000 series and including, without limitation, titanium alloys having an ASTM B 265 designation ranging from Grades 1-35, magnesium and magnesium-containing metals and alloys such as SAE/ASTM Unified Numbering System magnesium alloys of the M10000 series, copper-containing metals and alloys such as SAE/ASTM Unified Numbering System copper alloys of the C20000 through the C70000 series inclusive, and the like.

In some embodiments, firearms components of the present invention may be fabricated from bonded multi-metallic materials including combinations of at least two different iron-containing metals and alloys bonded to one another. Generally, the constituent metals and/or alloys bonded to one another to form the bonded multi-metallic substrates used in the present invention have different elemental compositions and different physical properties but, in some embodiments, the constituent metals and/or alloys of the multi-metallic substrates may have similar elemental compositions and/or physical properties but different magnetic properties, appearances, colors, metallic lusters, and the like. Constituent metals and alloys, and multi-metallic combinations forming the bonded multi-metallic material may be chosen based on rigidity, density, cost, corrosion-resistance, hardness, wear-resistance, impact-resistance, mechanical properties, weight, fracture toughness, fatigue-resistance, metallic luster, color, creep-resistance, elastic modulus, yield strength, resistance to stress, corrosion and/or cracking, machinability, magnetic properties, anti-galling properties, and the like.

In one embodiment, for example, bonded multi-metallic materials and firearms components of the present invention may comprise an iron-containing layer in combination with a metallic layer having different properties, such as a titanium-containing layer, an aluminum-containing layer, a copper-containing layer, a magnesium-containing layer, or another metallic material having properties different from those of the iron-containing layer. In another embodiment, firearms components of the present invention may incorporate iron-containing surface layers providing high impact- and wear-resistance, with a different material, such as an aluminum-containing and/or titanium-containing material positioned as an intermediate layer, providing lighter weight or other properties different from those of the iron-containing layer(s). Bonded multi-metallic substrates having several distinct metallic layers composed of several distinct metallic materials may be used. Multiple layers may have different thicknesses and the thickness of individual layers may be constant, or may vary, over the surface area of the substrate material.

Exemplary bonded multi-metallic substrate materials include, for example: an iron-containing metal or alloy, such as a steel alloy or stainless steel bonded to aluminum or an aluminum-containing metal or alloy; an iron-containing metal or alloy, such as a steel alloy or stainless steel bonded to titanium and/or a titanium-containing metal or alloy; an iron-containing metal or alloy, such as a steel alloy or a stainless steel bonded to magnesium or a magnesium-containing metal or alloy; titanium or a titanium-containing metal or alloy bonded to aluminum or an aluminum-containing metal or alloy, or to magnesium or a magnesium-containing metal or alloy; a copper-containing metal or alloy bonded to an aluminum-containing metal or alloy; a copper-containing metal or alloy bonded to magnesium and/or a magnesium-containing metal or alloy; a copper-containing metal or alloy bonded to titanium and/or a titanium-containing metal or alloy; steel or a steel-containing metal or alloy bonded to copper and/or a copper-containing metal or alloy; and a stainless steel-containing alloy bonded to copper and/or a copper-containing metal or alloy. Additional metallic layers comprising any of the materials listed above may also be incorporated in the bonded multi-metallic substrate materials.

Firearms components of the present invention are generally fabricated using a multi-layer substrate of the bonded multi-metallic material at least as thick as the final thickness of the desired component. Component patterns are generally positioned or drawn or imaged and oriented on bonded metallic substrate materials so that the material bond line(s) are oriented and positioned as desired in the final component and the substrate material is cut, machined, punched, water jetted, sawn or otherwise mechanically divided to produce a rough component blank. Rough component blanks may then be further formed or refined to desired specifications by machining, or using other suitable methods, to the desired final component configuration and three dimensional conformation while maintaining the desired orientation and position of bond line(s).

DESCRIPTION OF THE INVENTION

In one embodiment, firearms components of the present invention are fabricated from bonded multi-metallic materials provided as explosively bonded metallic materials. The bonded multi-metallic materials may comprise multiple metallic materials having different compositions and different properties, with an interface region and a bond zone provided between each set of metallic layers. The constituent metallic layers may contact one another directly in the interface region and bond zone. Alternatively, metallic interlayers may be provided between adjoining metallic layers.

Bonded multi-metallic materials may comprise at least two metallic layers composed of at least two different metallic materials having different properties. Bonded multi-metallic materials are generally constructed as sheet materials, and firearms components of the present invention may be machined or otherwise fabricated from sheet material substrates. In some cases, bonded multi-metallic base materials may be constructed as cylindrical base structures and firearms components are machined from the cylindrical base structures. Non-metallic materials, including various types of rubbery materials, plastics, thermoplastics, wood and the like may be mounted, or fastened, on an outer surface of the bonded multi-metallic components, or within recesses or cavities of the bonded multi-metallic components, for functional and decorative purposes.

Exemplary bonded multi-metallic materials include metallic base materials comprising various ferrous and non-ferrous metals and alloys (e.g., stainless steels such as AISI 300 series and/or 400 series stainless steels, titanium and titanium-containing materials and alloys such as ASTM B265 Grades 1 through 5, copper-nickel alloys such as Monel™ K500, and copper-aluminum alloys such as aluminum-bronze) bonded to other metallic materials including aluminum and aluminum-containing metals and alloys, such as AA6061 and/or AA 7075 as well as aluminum alloys containing scandium, and magnesium or magnesium-containing materials and alloys such as AZ80A. The bonded multi-metallic material may also incorporate metallic interlayers between the constituent metals to facilitate bonding or to provide other desirable properties. In some embodiments, metal matrix composites and cermet materials may be used as constituent materials forming bonded multi-metallic materials and are considered "metallic" materials for purposes of this disclosure.

The bond zone preferably has a generally uniform physical and mechanical structure along the interface region and preferably provides an abrupt transition from one metallic layer to the other with no substantial degradation of the physical and mechanical properties of either of the constituent metals. The bond zone is preferably characterized by a metallurgical bond region that extends on the order of several atomic layers on the surface of each metal and doesn't materially change the physical and mechanical properties of either of the metals. Alternatively, the bond zone may include one or more interlayer(s) comprising another constituent material that promotes bonding of the two dissimilar metals with no substantial degradation of the physical and mechanical properties of either of the constituent metals. Niobium- and tantalum-containing materials are used as interlayer materials for some applications.

The thickness dimension of the constituent metallic layers forming the bonded multi-metallic material may be generally equivalent or, in some embodiments, may be unequal. In one embodiment, a bonded multi-metallic material may comprise a stainless steel or another generally heavy, hard, impact- and wear-resistant material having a thickness less than that of another, lighter weight metallic material, such as an aluminum- or titanium- or magnesium-containing metal. In one embodiment, a heavier metallic layer has a thickness of no more than about 50% the thickness of the lighter weight metallic layer; in some embodiments the heavier metallic layer has a thickness of no more than about 40% the thickness of the lighter metallic layer; in other embodiments, the heavier metallic layer has a thickness of no more than about 25% the thickness of the lighter metallic layer; in yet other embodiments, the heavier metallic layer has a thickness of no more than about 10%, or no more than about 5%, the thickness of the lighter metallic layer.

In some embodiments, the bonded multi-metallic material comprises layer of a generally hard, impact- and wear-resistant material on either side of one or more intermediate layer(s) having generally lighter weight properties. In this embodiment, the two opposite surface layers may comprise the same or different materials, and may have equivalent or different thicknesses. The lighter weight intermediate layer, likewise, may have a thickness equivalent to that of one or both surface layers, or may have a different, and generally larger, thickness. In some embodiments, the sum of the thicknesses of the surface layers may be less than that of intermediate layer(s). In one embodiment, the sum of the thicknesses of the surface metal layers is no more than about 50% the thickness of the intermediate layer(s); in some embodiments the sum of the thicknesses of the outer surface metal layer(s) is no more than about 40% the thickness of the intermediate layer(s); in other embodiments, the sum of the thicknesses of the outer surface metal layer(s) is no more than about 25% the thickness of the intermediate layer(s); in yet other embodiments, the sum of the thicknesses of the outer surface metal layer(s) is no more than about 10%, or no more than about 5%, the thickness of the intermediate layer(s).

Figure 1A:
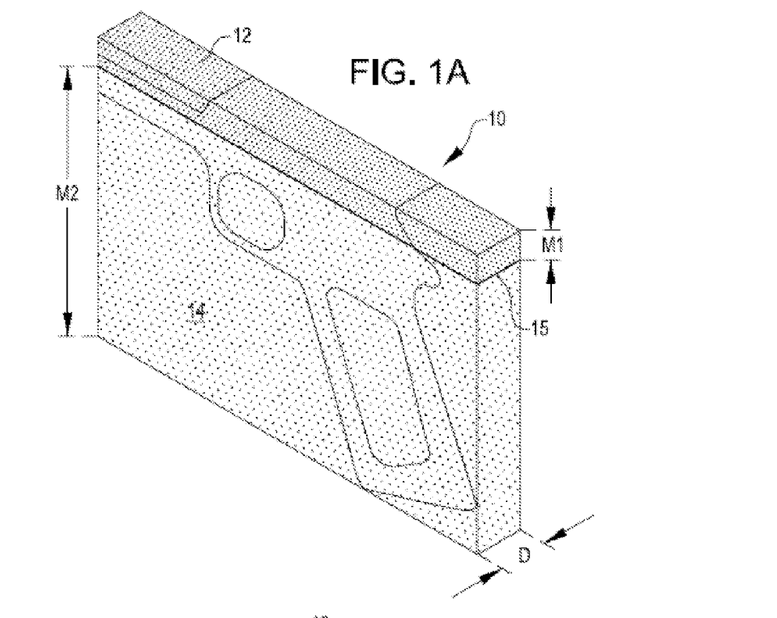
FIG. 1A shows a schematic perspective drawing of a bonded multi-metallic substrate material with a pattern for forming a rough blank of a firearm frame component.

FIG. 1A shows a schematic diagram illustrating a bonded multi-metallic material substrate with a firearm frame member pattern superimposed on the substrate. In this illustrative embodiment, the bonded multi-metallic base material substrate 10 is composed of a sheet comprising a first wear and impact-resistant metallic layer 12 bonded to a second, dissimilar and lighter weight metallic layer 14 along an interface region at bond zone 15. The bonded multi-metallic substrate material may be fabricated using explosion bonding (or explosion welding) techniques that are known in the art, or using other techniques that provide a solid state bond between the constituent metallic layers. As shown in FIG. 1A, the more wear- and impact-resistant metallic layer 12 is arranged at the upper portion of the firearm frame member where the frame member experiences impact and movement in relation to other surfaces or components, such as the barrel and slide. The lighter weight metallic layer 14 is arranged to form the lower portion of the frame member and the handle or grip, which experiences less impact and movement in relation to other components.

The heavier and more impact resistant constituent metallic material is preferably at least thick enough to form the exposed surface of the upper portion of the frame member that receives and interfaces with the barrel and the slide. In some embodiments, the thickness M1 of the heavier and more impact resistant constituent metal is less than about 3 cm; in other embodiments, thickness M1 is less than about 2 cm thick; in still other embodiments, thickness M1 is less than about 1 cm thick. In particular embodiments, the thickness M2 of the lighter constituent metallic material is generally at least about 6 cm; may be at least about 8 cm thick; and, in yet other embodiments, may be more than 10 cm, or more than 12 cm thick. The depth D of the multi-metallic base material substrate is generally approximately equivalent to or slightly larger than the dimensions of the final frame component.

A frame member blank may be cut, machined or otherwise separated from the substrate according to the pattern shown schematically in FIG. 1A. The frame member blank may then be further machined to provide the desired three dimensional configuration and surface conformation of the finished frame member component 16, shown in an exemplary configuration in FIG. 1B. The frame component may undergo further treatment and processing, such as the application of other materials and surface treatments.

Figure 2A:
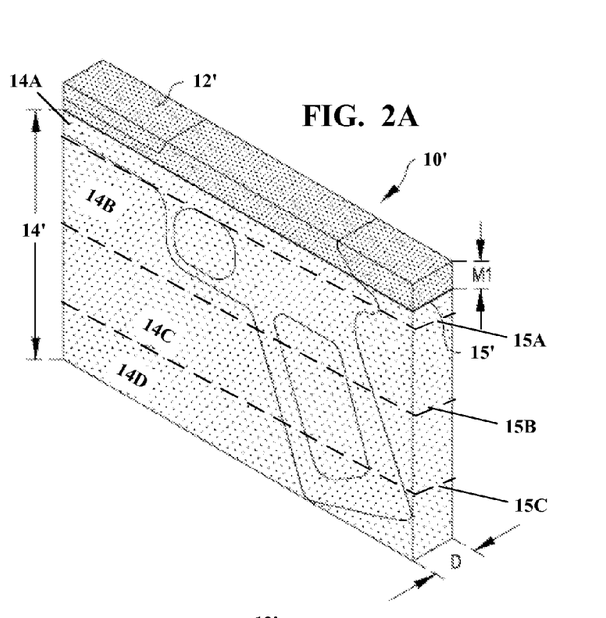
FIG. 2A shows a schematic perspective drawing of another embodiment of a bonded multi-metallic substrate material with a pattern for forming a rough blank of a firearm frame component.
Figures 2B, 3:
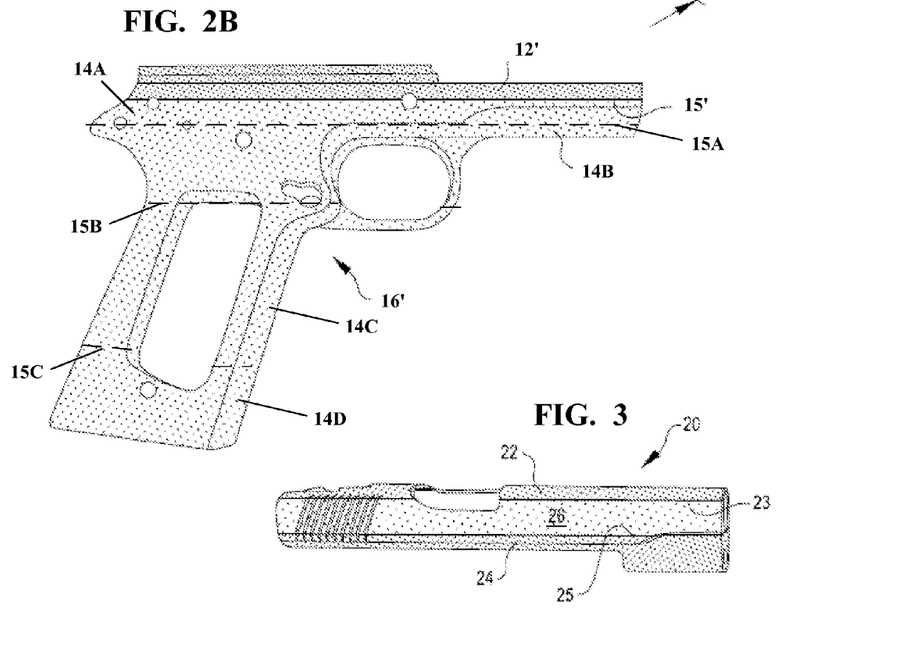
FIG. 2B shows a schematic perspective drawing of a firearm frame component fabricated from a bonded multi-metallic substrate of FIG. 2A machined to form a final, finished multi-metallic frame component.
FIG. 3 shows a schematic perspective drawing of a firearm slide component of the present invention fabricated from a bonded multi-metallic base material composed of multiple metals bonded to one another.

FIGS. 2A and 2B shows schematic diagrams illustrating another embodiment of a bonded multi-metallic material substrate and a finished firearm frame member blank constructed from the substrate. In this illustrative embodiment, the bonded multi-metallic base material substrate 10' is composed of a sheet comprising a first wear and impact-resistant metallic layer 12' bonded to a second, dissimilar and lighter weight metallic layer 14A along an interface region at bond zone 15'. Bond zone 15' is preferably a metallurgical bond zone and may be provided by roll bonding, explosive bonding, metal cladding, high pressure and thermal bonding techniques, casting techniques, or the like.

In this embodiment, the thicker metallic layer 14' is composed of multiple metallic layers 14A, 14B, 14C and 14D, with multiple bond regions 15A, 15B and 15C formed at the interfaces of the neighboring metallic layers. Each of the metallic layers 14A, 14B, 14C and 14D may comprise the same or a similar metallic material; alternatively, different layers may be composed of different metallic materials. Each bond region 15A, 15B and 15C may be provided using a metallurgical bonding technique, such as roll bonding, explosive bonding, metal cladding, high pressure and thermal bonding techniques, casting techniques, and the like, and each bond region 15A, 15B and 15C is preferably a metallurgical bond zone.

In one embodiment, a wear- and impact-resistant metallic layer 12' comprising an iron- or steel- or titanium-containing metallic material, such as a stainless steel material, is arranged at the upper portion of the firearm frame member where the frame member experiences impact and movement in relation to other surfaces or components, such as the barrel and slide. A lighter weight metallic layer 14A comprising, for example, an Aluminum- or titanium-containing metallic material, is bonded to layer 12' at bond zone 15', with the metallurgical bond region formed using a roll bonding technique. An additional metallic layer 14B may comprise a metallic material that is the same as or different from the material of layer 14A, and bond zone 15A at the interface of layers 14A and 14B, is a metallurgical bond formed using a technique other than roll bonding, such as explosive bonding. Optional additional metallic layers 14C and 14D, comprising metallic materials that are the same as or different from the material of layers 14A, 14B, etc., incorporate bond zones 15B, 15C, etc., at layer interfaces, which are characterized by metallurgical bonds formed using any one of a variety of techniques, including explosive bonding techniques. This is an example of metallic substrate materials composed of metallic layers, at least one metallic layer comprising a material that is dissimilar from at least one other metallic layer, wherein the bond zones are characterized by metallurgical bonds formed using at least two different metal bonding techniques.

In one embodiment, a wear- and impact-resistant metallic layer comprising stainless steel, for example, is bonded to a lighter weight metallic layer along a metallurgical bond region formed by roll bonding, while an opposing surface of the lighter weight metallic layer is bonded to another metallic layer of the same or a different composition along a metallurgical bond region formed by explosive bonding techniques. One exemplary bonded multi-metallic material comprises a relatively thin layer of a wear- and impact-resistant metallic layer bonded to a relatively thin layer of a lighter weight metallic layer along a metallurgical bond region formed by roll bonding, while an opposing surface of the lighter weight, relatively thin metallic layer is bonded to a thicker layer of another metallic layer along a metallurgical bond region formed by explosive bonding. The thickness of the wear- and impact-resistant metallic layer may be less than 1 inch and, in some embodiments, less than ½ inch. The thickness of the relatively thin layer of lighter weight metallic material bonded to the wear- and impact-resistant metallic layer may also be less than 1 inch and, in some embodiments, may be no more than 50% more, or less, than the thickness of the wear- and impact-resistant metallic layer. The thickness of the thicker metallic layer bonded to the relatively thin layer is generally at least twice the thickness of the neighboring thinner layer, and may be at least 4 times, or 6 times, or 10 times or more the thickness of the neighboring thinner layer.

The heavier and more impact resistant constituent metallic material is preferably at least thick enough to form the exposed surface of the upper portion of the frame member that receives and interfaces with the barrel and the slide. In some embodiments, the thickness M1' of the heavier and more impact resistant constituent metal is less than about 3 cm; in other embodiments, thickness M1' is less than about 2 cm thick; in still other embodiments, thickness M1' is less than about 1 cm thick. In some embodiments, a composite metallic material composition formed by multiple metal layers, such as 14A, 14B, 14C and 14D comprises a lighter constituent metallic material and, in the aggregate, is at least about 6 cm thick; may be at least about 8 cm thick; and, in yet other embodiments, may be more than 10 cm, or more than 12 cm thick.

A frame member blank may be cut, machined or otherwise separated from the multi-metallic substrate according to the pattern shown schematically in FIG. 2A. The frame member blank may then be further machined to provide a desired three dimensional configuration and surface conformation of the finished frame member component 16', shown in an exemplary configuration in FIG. 2B. The frame component may undergo further treatment and processing, such as the application of other materials and surface treatments.

Figure 1B:
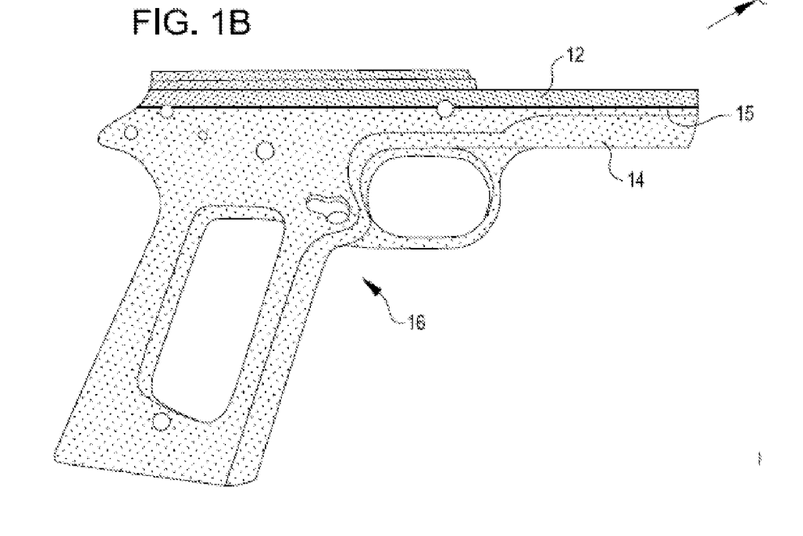
FIG. 1B shows a schematic perspective drawing of a firearm frame component fabricated from a bonded multi-metallic substrate of FIG. 1A machined to form a final, finished multi-metallic frame component.

The surfaces of framework member 16, 16' that experience high impact and relative movement, shown as the upper surfaces of frame member component 16, 16' where the framework member engages the slide, are formed by the more impact-resistant metallic material layer 12, 12' and bond line 15, 15' is arranged below these surfaces in the finished component. In some embodiments, the upper area of the framework member that engages the slide comprises a steel alloy such as 4140 and/or a stainless steel alloy such as 303 or 304L. In another embodiment, the upper area of the framework member that engages the slide comprises a titanium-containing material or alloy, such as a titanium alloy having an ASTM B 265 designation ranging from Grades 1 through 35. A lighter weight and/or less impact resistant metallic material forms the lower portion of the frame member, which experiences less impact and movement in relation to other components. In some embodiments, the lower portion of the frame member comprises an aluminum-containing material, such as aluminum alloy 6061 or 6062. In alternative embodiments, the lower portion of the frame member comprises a titanium-containing alloy having an ASTM B 265 designation ranging from Grades 1 through 35, and in some embodiments, the lower portion of the frame member comprises titanium alloy Grade 2.

FIG. 3 illustrates an exemplary firearm slide component composed of a bonded multi-metallic material having a different composition and configuration. In this illustration, slide component 20 is fabricated from a bonded multi-metallic material comprising outer (e.g., upper and lower) layers 22, 24 arranged on opposite surfaces of the bonded multi-metallic material substrate with an intermediate layer 26 comprising a lighter weight metallic material or a metallic material having another property different from that of the outer layers. The outer surface layers 22, 24 may be composed of the same or different materials. In one embodiment, for example, outer surface layers 22 and 24 comprise an iron-containing metal such as a stainless steel, and the intermediate layer comprises a lighter weight metallic material such as aluminum, an aluminum-containing material or alloy, titanium, a titanium-containing material or alloy, or the like. The interface zones are shown as bond lines 23, 25, which may be provided as direct bonds of the constituent materials, or may alternatively be provided as metallic interlayer(s). The outer layers of heavier, more impact- and wear-resistant material are generally less thick than the intermediate layer comprising the lighter weight metallic material, and the outer layers are arranged to provide surfaces that experience high impact and relative movement. Slide component 20 may first be provided as a blank from a sheet of bonded multi-metallic material, as described above, and then machined to provide the desired three-dimensional structure and surface conformation, as shown.

Figures 4A, 4B, 4C:
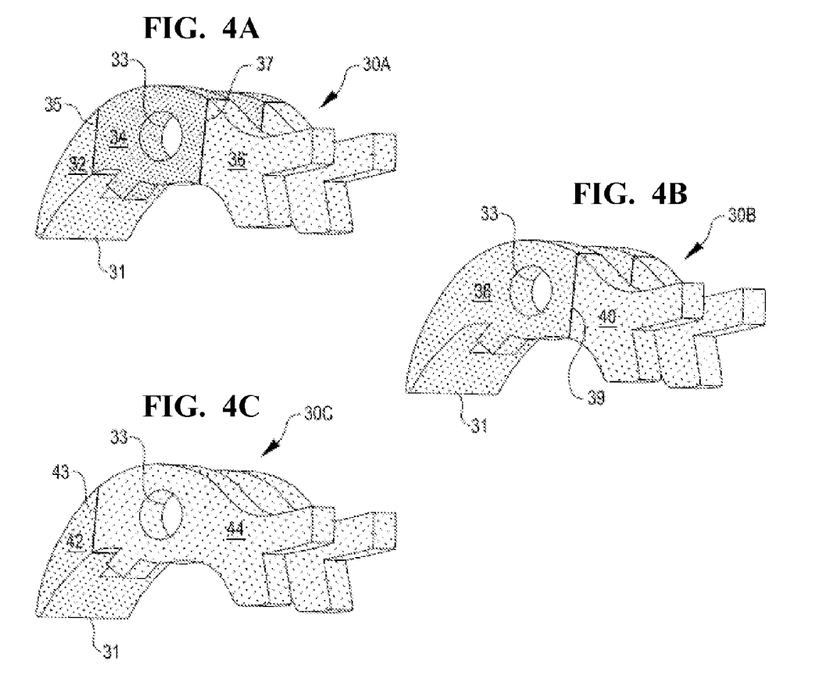
FIGS. 4A-4C schematically illustrate multiple embodiments of a firearm sear component of the present invention fabricated from multi-metallic base sheet materials having different structures and configurations.

FIGS. 4A-4C schematically illustrate multiple alternative embodiments of a firearm sear component fabricated from bonded multi-metallic base components having different structures and configurations. The sear component has wear points generally at the distal portion 31 of the component and at the central bore 33. In the embodiment shown in FIG. 4A, sear component 30A is fabricated from a bonded multi-metallic substrate material comprising at least three constituent metallic materials. In this embodiment, sections 32 and 34 are provided as different materials, each of the materials having generally wear- and impact-resistant properties, such as two different iron-containing metals, such as steel alloys or stainless steels. Section 36 experiences less wear during operation of the firearm and is provided as a lightweight material, such as an aluminum or titanium-containing metal. Bond interfaces are shown as bond lines 35, 37 and, in this embodiment, the thickness of each of the constituent metallic layers is generally equivalent. Sear component 30A may first be provided as a blank formed from a sheet of bonded multi-metallic material, and then may be machined to provide the desired three-dimensional structure and surface conformation.

FIGS. 4B and 4C schematically illustrate alternative embodiments of a firearm sear component fabricated from multi-metallic substrate materials comprising at least two constituent metallic materials. In the embodiment illustrated in FIG. 4B, sear component 30B comprises section 38 formed from a material having wear- and impact-resistant properties, such a steel alloy or stainless steel material, with both wear points 31 and 33 being located in the sear component at a location within section 38. Section 40 experiences less wear during operation of the firearm and is provided as a lightweight material such as an aluminum- or titanium-containing metal. The material interface is shown as bond line 39. In this embodiment, the thickness of each of the constituent metallic layers is unequal, with the heavier, more wear- and impact-resistant metallic layer being thicker than the lighter weight metallic layer.

In the embodiment illustrated in FIG. 4C, sear component 30C comprises section 42 formed from a material having wear- and impact-resistant properties, such a steel alloy or stainless steel material, and wear point 31 is located in the component at a location within section 42. In this embodiment, section 44 may be provided as a different steel alloy or stainless steel material, or it may be provided as a lightweight material such as an aluminum- or titanium-containing metal, with wear point 33 being located in the component at a location within section 44. The material interface is shown as bond line 43. In this embodiment, the thickness of each of the constituent metallic layers is unequal, and the lighter weight metallic layer is thicker than the heavier, more wear- and impact-resistant metallic layer.

Figure 5A:
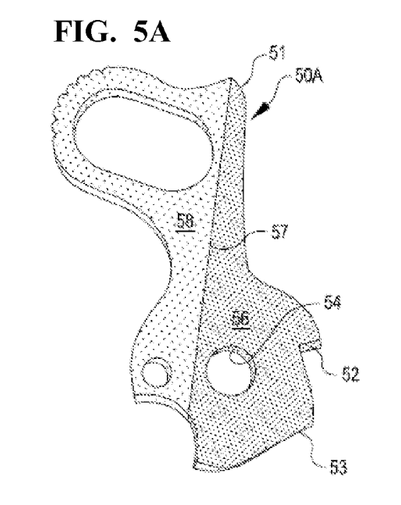
FIGS. 5A and 5B show schematic drawings of two embodiments of a firearm hammer component of the present invention fabricated from a multi-metallic base she material composed of multiple metals bonded to one another with the bond line arranged in different locations.
Figure 5B:
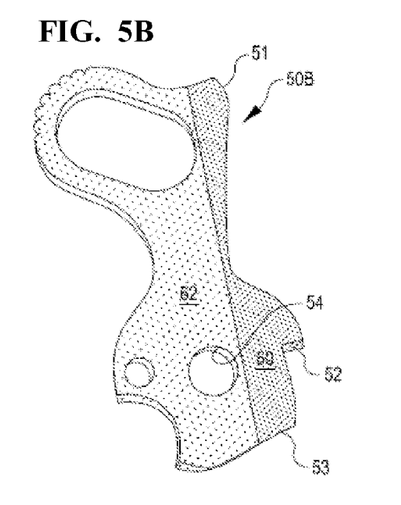

FIGS. 5A and 5B schematically illustrate multiple embodiments of a firearm hammer component fabricated from bonded multi-metallic materials having the same composition but having different bond line geometries and, therefore, different weight and configuration characteristics. The hammer component experiences a generally high impact zone in the area indicated generally by reference numeral 51 and has wear points generally at locations 52, 53 and 54. In the embodiment shown in FIG. 5A, hammer component 50A is fabricated from a bonded multi-metallic substrate material comprising at least two constituent metallic materials. In this embodiment, section 56 is formed from a material having generally high wear- and impact-resistant properties, such as a steel or stainless steel material. Section 58 experiences less wear and impact during operation of the firearm and is provided as a lightweight material such as an aluminum- or titanium-containing metal. The bond interface is shown as bond line 57. In this embodiment, the high impact area and all of the wear points are located in section 58, formed from a wear- and impact-resistant metallic material. Hammer component 50A may first be provided as a blank formed from a sheet of bonded multi-metallic material, with the pattern aligned to appropriately orient the bond line in the hammer blank and final hammer component. The blank may then be machined to provide the desired three-dimensional structure and surface conformation.

FIG. 5B schematically illustrates an alternative embodiment of a firearm hammer component 50B fabricated from a bonded multi-metallic substrate material comprising at least two constituent metallic materials. In the embodiment illustrated in FIG. 5B, section 60 is formed from a material having generally high wear- and impact-resistant properties, such as a steel or stainless steel material. Section 62 experiences less wear and impact during operation of the firearm and is provided as a lightweight material such as an aluminum- or titanium-containing metal. The bond interface is shown as bond line 61. In this embodiment, the high impact area and most, but not all, of the wear points are located in section 60, formed from a wear- and impact-resistant metallic material. Hammer component 50B may first be provided as a blank formed from a sheet of bonded multi-metallic material, with the pattern aligned to appropriately orient the bond line in the hammer blank and final hammer component. The blank may then be machined to provide the desired three-dimensional structure and surface conformation.

Exemplary firearms components comprising bonded multi-metallic materials are illustrated schematically and described in detail above. Those having skill in the art will recognize that these specific embodiments are illustrative and that many additional and alternative component designs may be conceived and implemented within framework of the invention disclosed herein. Any of the constituent metallic materials described herein may be used in any combination with other constituent metallic materials, and various firearms components may be configured, and fabricated, using various combinations of bonded multi-metallic materials. Additional firearms components that may be constructed using bonded multi-metallic base materials include: stocks; handles; gas tubes; extractors; sub-frames; receivers; barrels; bolts; blocks; doors; rollers; trunions; bushings; gudgeons; actuators; magazine wells; stops; various links and pins; various housing components; extractors; trigger mechanisms; safety mechanisms; firing chambers; grips; plungers; ejectors, sights, and the like.

We claim:

1. A firearm component fabricated from a metallurgically bonded multi-metallic material substrate composed of at least three metallic layers joined at at least two bond zones, each of the bond zones being characterized by a metallurgical bond region, wherein at least two of the metallic layers have different properties, the at least two bond zones are fabricated using different metal bonding techniques, and a depth dimension (D) of each of the metallic layers forming the multi-metallic material substrate is equivalent to or slightly larger than a corresponding depth dimension of a finished firearm component.

2. The firearm component of claim 1, wherein the bonded multi-metallic material substrate comprises a first impact-resistant layer bonded to a second, different and lighter weight layer along the first metallurgical bond region, and a third layer having different and lighter weight properties than the first layer bonded to the second layer along the second metallurgical bond region.

3. The firearm frame component of claim 2, wherein the second and third layers comprise at least one of the following metals: aluminum, an aluminum alloy, titanium, a titanium alloy, magnesium, and a magnesium alloy.

4. The firearm component of claim 2, wherein the second and third layers comprise the same material.

5. The firearm component of claim 1, wherein the at least one of the metallurgical bond regions is formed using a roll bonding technique.

6. The firearm component of claim 1, wherein at least one metallic layer comprises at least one of the following metals: aluminum, an aluminum alloy, titanium, a titanium alloy, magnesium, and a magnesium alloy.

7. The firearm component of claim 1, wherein at least one metallic layer comprises an iron-containing metal and at least one of the other metallic layers comprises an aluminum-containing metal.

8. The firearm component of claim 1, wherein at least one metallic layer comprises an iron-containing metal and at least one of the other metallic layers comprises a titanium-containing metal.

9. The firearm component of claim 1, wherein at least one metallic layer comprises a titanium-containing metal and at least one of the other metallic layers comprises an aluminum-containing metal.

10. The firearm component of claim 1, wherein at least one metallic layer comprises an iron-containing metal and at least one of the other metallic layers comprises a magnesium-containing metal.

11. The firearm component of claim 1, wherein at least one metallic layer comprises a titanium-containing metal and at least one of the other metallic layers comprises a magnesium-containing metal.

12. The firearm component of claim 1, wherein at least one metallic material is selected from the group consisting of one of the following stainless steels: 301, 302, 303, 303Se, 304, 304L, 309, 316, 316L, 410, 416, 440AQ, 440B and 440C.

13. The firearm component of claim 1, wherein at least one metallic material is selected from the group consisting of: titanium, a titanium alloy of the R50000 series, and a titanium alloy having an ASTM B 265 designation ranging from Grades 1-5.

14. The firearm component of claim 1, wherein at least one metallic material is selected from the group consisting of: aluminum, an aluminum alloy selected from the group consisting of 2024, 5086, 6061, 6063 and 7075, and an aluminum alloy containing scandium.

15. The firearm component of claim 1, wherein the component is selected from the following: frame or body; slide; barrel; sear; stock; handle; extractor; sub-frame; receiver; block; door; roller; trunion; actuator; magazine well; housing component; trigger mechanism; safety mechanism; firing chamber; grip; plunger; ejector and sights.

16. The firearm component of claim 1, wherein the component is a semi-automatic pistol slide.

17. The firearm component of claim 1, wherein the component is a semi-automatic pistol frame.

18. A firearm comprising at least one of the components of claim 15.

19. The firearm component of claim 1, wherein at least one of the metallurgical bond regions is formed using an explosion bonding technique.

20. A firearm frame component fabricated from a bonded multi-metallic material comprising a first metallic layer metallurgically bonded to a second, different and lighter weight metallic layer along a first metallurgical bond region and a third metallic layer metallurgically bonded the second metallic layer along a second metallurgical bond region, wherein the first metallurgical bond region is planar and is formed by a roll bonding technique and the second metallurgical bond region is formed by explosive bonding, and wherein the thickness of the third metallic layer is at least twice the thickness of the second, lighter weight metallic layer.

21. The firearm component of claim 20, wherein the first layer comprises a steel- or titanium-containing metallic material and the second and third metallic layers comprise an Aluminum-containing metallic material.

22. A firearm frame component fabricated from a bonded multi-metallic material comprising at least two metallic materials having different properties metallurgically bonded to one another in a metallurgical bond region, wherein the metallurgical bond region is planar and is oriented horizontally when the firearm frame component is assembled in a firearm, wherein the a first metallic material has higher strength properties than a second metallic material and the second metallic material has lower weight properties than the first metallic material, and wherein the first metallic material is arranged at a portion of the firearm component that requires a higher strength material.

23. The firearm frame component of claim 22, wherein the first and second metallic materials are flat sheet materials bonded to one another.

* * * * *